Figure 1:
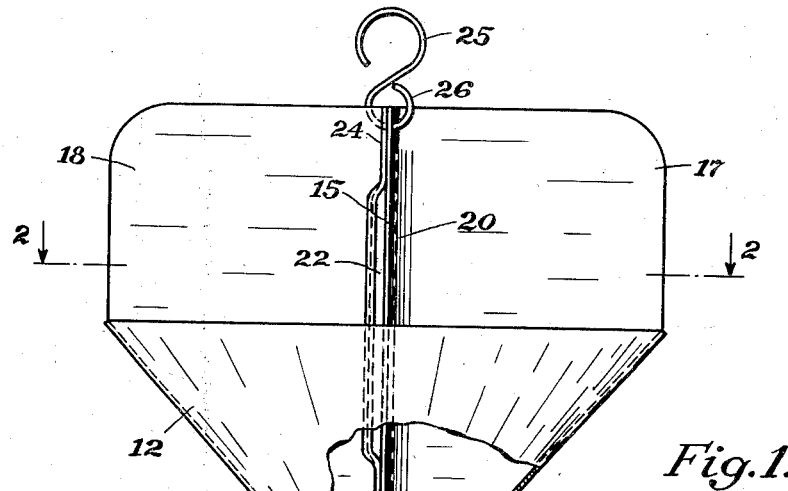

Aug. 28, 1934.   J. J. BROOKE   1,971,367
BEETLE TRAP
Filed Aug. 13, 1932

WITNESS:
Christel Pistor
Anna M. Ward

INVENTOR
James J. Brooke.
BY
Joshua R. H. Potts
ATTORNEY

Patented Aug. 28, 1934

1,971,367

UNITED STATES PATENT OFFICE 1,971,367

BEETLE TRAP

James J. Brooke, Berwyn, Pa.

Application August 13, 1932, Serial No. 628,631

3 Claims. (Cl. 43—122)

This invention relates to beetle traps, and has for an object to provide a new and improved trap for catching the insect known as "Japanese beetle".

A further object of the invention is to provide in a beetle trap improved means for holding bait in minimum quantities and with minimum exertion for removal and replacement.

A further object of the invention is to provide a beetle trap having the maximum partition space against which the beetle will abut in flying to or toward the bait to deposit the beetle in an underlying receptacle.

A further object of the invention is to provide the partitions so associated and formed as to produce bait holding grooves substantially at the axis of the insect trap and in each individual compartment provided by such partitions.

The invention, therefore, comprises a receptacle having a removable cover with a funnel attached to the cover and communicating through the cover to the interior of the receptacle with angularly disposed partitions within and extending above the funnel, and stopping short of the lower extreme of said funnel, said partitions being so associated that at substantially the axis of the funnel and at the point of interconnection of the partitions, grooves are formed in each compartment for receiving bait, such grooves being so formed as to be readily cleaned of spent bait and rebaited.

Figure 3:
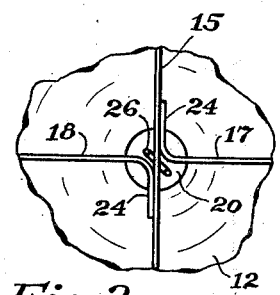
Figure 4:
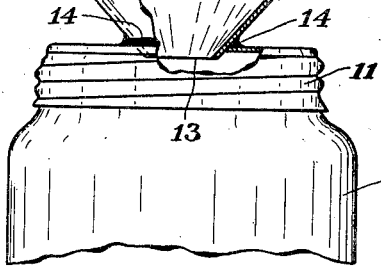
Figure 4:
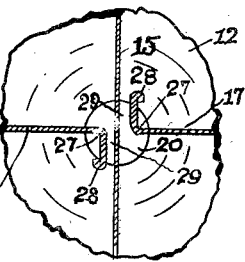
Figure 2:
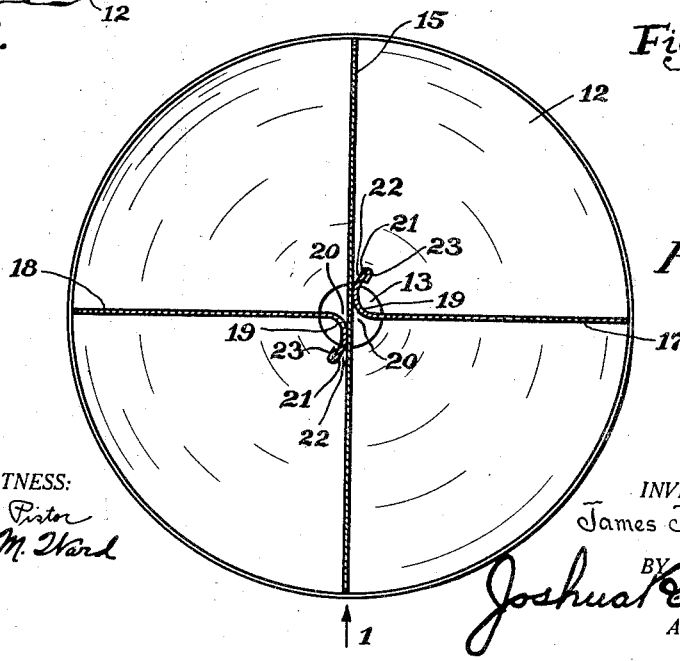

In the drawing:

Figure 1 is a view of the improved trap in side elevation, parts being broken away, Figure 2 is a sectional view taken on line 2—2 of Figure 1, Figure 3 is a fragmentary top plan view showing the manner of attaching the partitions at the axis, and Figure 4 is a transverse fragmentary sectional view through a modified type of trap.

Like characters of reference indicate corresponding parts throughout the several views.

The improved beetle trap which forms the subject-matter of this application is adapted to be employed in association with a jar 10. This jar or receptacle 10 is of the type ordinarily referred to as a "Mason jar" having a cap 11 secured thereon by the usual threaded means.

Secured to the cap 11 is a funnel 12 which extends through the cap, as at 13, and is rigidly secured in any approved manner, as by solder, indicated at 14.

This funnel 12 is merely a truncated cone having a diametrical partition 15 extending from a position indicated at 16 adjacent to the opening 13 and well above the top circular edge of the funnel 12.

Rigidly secured to this diametrical partition 15 are radial partitions 17 and 18. The partitions 17 and 18 also extend well above the top of the funnel 12 to the height of the partition 15 so that the said partitions form a quadrant and four compartments of an angular form.

While four of these compartments have been shown and have been found by experience to be ample and desirable, it is obvious that more or less compartments would be within the scope of the invention.

The partitions 17 and 18 are preferably in planar alignment, as indicated at Figure 2, but have their inner edges bent, as at 19, to form grooves 20 which extend vertically substantially at the axis.

The edges are further bent, as at 21, to form grooves 22 similar to the grooves 20. Preferably, the extreme edges of these partitions will be folded back, as at 23.

This construction may extend only throughout a portion of the vertical dimension of the partitions, as indicated more particularly at Figure 1, so that at both top and bottom the folded back part of the partitions 17 and 18 will be formed, as at 24, for the purpose of soldering the partitions 15, 17 and 18 together.

For suspending, when desirable, a hook 25 will be attached in any approved manner. As shown in the drawing it is by means of a ring 26 through the partition 15, but it is to be understood, of course, that it may be applied in some other manner.

As a modification of the foregoing, the type shown at Figure 4 will have the partitions 17 and 18 bent, as at 27, and rolled or folded, as at 28. This will form attempted passages 29 between the turn-back ends of the partitions 17 and 18 and the partition 15. These attenuated passages will extend along the partition 15 a length equivalent to the length of the grooves 20 and 22. It will thus be seen that slots or grooves are equally applicable to the present invention, and either will be employed as the exigencies of use or manufacture may make necessary or desirable.

In operation, the bait will be introduced into the grooves 20, 22 or 29 in any approved manner. The finger of the operator is as good an implement as any for forcing the granular bait into these grooves. The bait, being usually slightly sticky, will be retained in the grooves.

By making the grooves of small area, as shown in the drawing, only a small amount of bait is required for properly baiting the trap. As so small an amount is required, it may be more often renewed and, therefore, present fresher, more odorous bait.

To remove the spent bait, an implement having a point to correspond to the shape of the grooves 20, 22 or 29 is employed, and by simply raking this implement from end to end of the grooves, all of the bait is instantly removed. By having the grooves all of the same formation, the same implement is employed for all. After removal of the bait, it is again baited as above outlined.

The trap may be supported by setting upon any convenient object or suspended by the hook 25.

Of course the beetle trap herein shown may be modified and changed in various ways without departing from the invention herein set forth and hereafter claimed.

I claim:—

1. In a beetle trap comprising a funnel, and a receptacle associated with the funnel, partitions disposed within the funnel and extending thereabove, said partitions meeting substantially at the axis of the funnel and parts of some partitions bent backwardly upon themselves to form bait slots substantially at the axis of the funnel.

2. In a beetle trap, partition members arranged as radially extending wings, said wings meeting substantially at a median line and so bent that some of said partitions form relative to other of said partitions bait receptacles upon both sides of one of said partitions.

3. In a beetle trap, a partition member having radially extending wings, said wings so bent that some parts of some of said partitions form conjointly with other of said partitions bait passages upon both sides of one of said partitions.

JAMES J. BROOKE.